(12) United States Patent
Dvorkin et al.

(10) Patent No.: US 10,397,403 B2
(45) Date of Patent: Aug. 27, 2019

(54) SYSTEM AND METHOD FOR MANAGING EVENTS AT CONTACT CENTER

(71) Applicant: RingCentral, Inc., Belmont, CA (US)

(72) Inventors: Jim Dvorkin, Redwood City, CA (US); Alexander Alekseevich Pantyukhin, Saint-Petersburg (RU)

(73) Assignee: RingCentral, Inc., Belmont, CA (US)

( * ) Notice: Subject to any disclaimer, the term of this patent is extended or adjusted under 35 U.S.C. 154(b) by 11 days.

(21) Appl. No.: 15/857,165

(22) Filed: Dec. 28, 2017

(65) Prior Publication Data

US 2019/0208058 A1    Jul. 4, 2019

(51) Int. Cl.
*H04M 3/51*    (2006.01)
*G06Q 10/10*   (2012.01)
*H04M 3/523*   (2006.01)

(52) U.S. Cl.
CPC ........ *H04M 3/5175* (2013.01); *G06Q 10/103* (2013.01); *H04M 3/5183* (2013.01); *H04M 3/5238* (2013.01)

(58) Field of Classification Search
CPC .. H04M 3/5175; H04M 3/523; H04M 3/5183; H04M 3/5232; H04M 3/5233; H04M 2203/402
See application file for complete search history.

(56) References Cited

U.S. PATENT DOCUMENTS

| | | | |
|---|---|---|---|
| 2002/0018554 A1* | 2/2002 | Jensen | H04M 3/5233 379/265.01 |
| 2007/0198325 A1 | 8/2007 | Lyerly et al. | |
| 2010/0002863 A1 | 1/2010 | Loftus et al. | |
| 2010/0274637 A1* | 10/2010 | Li | G06Q 10/06 379/265.06 |
| 2013/0111357 A1* | 5/2013 | McCormack | G06Q 10/06 715/753 |
| 2015/0195404 A1* | 7/2015 | O'Connor | H04M 3/5175 379/265.03 |

* cited by examiner

*Primary Examiner* — Nafiz E Hoque
(74) *Attorney, Agent, or Firm* — Finnegan, Henderson, Farabow, Garrett & Dunner, LLP

(57) ABSTRACT

A system for managing events at a contact center is disclosed. The system may include a memory and at least one processor. The at least one processor may be configured to receive an input from a user identifying at least one condition associated with a service level at the contact center, the at least one condition including at least a threshold of a call waiting time at the contact center; detect an occurrence of an event meeting one of the at least one condition; and in response to the detecting, provide a notification to a device associated with the user and operating in a collaboration environment, thereby notifying the occurrence of the event.

14 Claims, 16 Drawing Sheets

SYSTEM AND METHOD FOR MANAGING EVENTS AT CONTACT CENTER

TECHNICAL FIELD

The present disclosure relates to the field of contact center systems and, more particularly, systems and methods for managing events at a contact center.

BACKGROUND

Service organizations, such as consumer-service organizations, financial institutions, and product retailers, service customers using contact centers. Contact centers, also known as customer centers, may handle a variety of tasks, such as new-business acquisition, customer service, technical support, or customer billing. Organizations running contact centers seek to provide a service level of incoming calls that ensures satisfaction of customers. To achieve this, a contact center may have a number of agents answering calls from customers and supervisors monitoring the operation of contact center.

In a contact center, interactions between the contact center supervisors and agents are often disjointed. For example, supervisors at a contact center may not be aware of an ongoing shortage of agents until the service level of the contact center has dropped for a certain period of time. As the supervisors are not promptly notified when workflow issues occur at the contact center, the supervisors are not able to take prompt remedial actions to manage the contact center to bring back the service level, resulting in a compromise in the business goals of the contact center. Further, supervisors at the contact center may be required to log into their workstations at the contact center in order to view updated analytics of the contact center and status of agents. While the supervisors are attending meetings or otherwise away from their desks, it is difficult for the supervisors to monitor the operation of contact center and take appropriate actions when service level drops. A mechanism that effectively brings workflow issues at the contact center to the supervisor's attention and allows efficient interaction between supervisors and agents is therefore desired.

SUMMARY

In one disclosed embodiment, a system for managing events at a contact center is disclosed. The system comprises a memory and at least one processor. The at least one processor is configured to receive an input from a user identifying at least one condition associated with a service level at the contact center, the at least one condition including at least a threshold of a call waiting time at the contact center; detect an occurrence of an event meeting one of the at least one condition; and in response to the detecting, provide a notification to a device associated with the user and operating in a collaboration environment, thereby notifying the occurrence of the event.

In another disclosed embodiment, a computer-implemented method for managing events at a contact center. The computer-implemented method comprises receiving an input from a user identifying at least one condition associated with a service level at the contact center, the at least one condition including at least a threshold of a call waiting time at the contact center; detecting an occurrence of an event meeting one of the at least one condition; and in response to the detecting, providing a notification to a device associated with the user and operating in a collaboration environment, thereby notifying the occurrence of the event.

In another disclosed embodiment, a non-transitory computer readable medium is disclosed. The non-transitory computer readable medium stores a set of instructions that is executable by at least one processor of a contact center server to cause the contact center server to perform a method for managing events at a contact center. The method comprises receiving an input from a user identifying at least one condition associated with a service level at the contact center, the at least one condition including at least a threshold of a call waiting time at the contact center; detecting an occurrence of an event meeting one of the at least one condition; and in response to the detecting, providing a notification to a device associated with the user and operating in a collaboration environment, thereby notifying the occurrence of the event.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
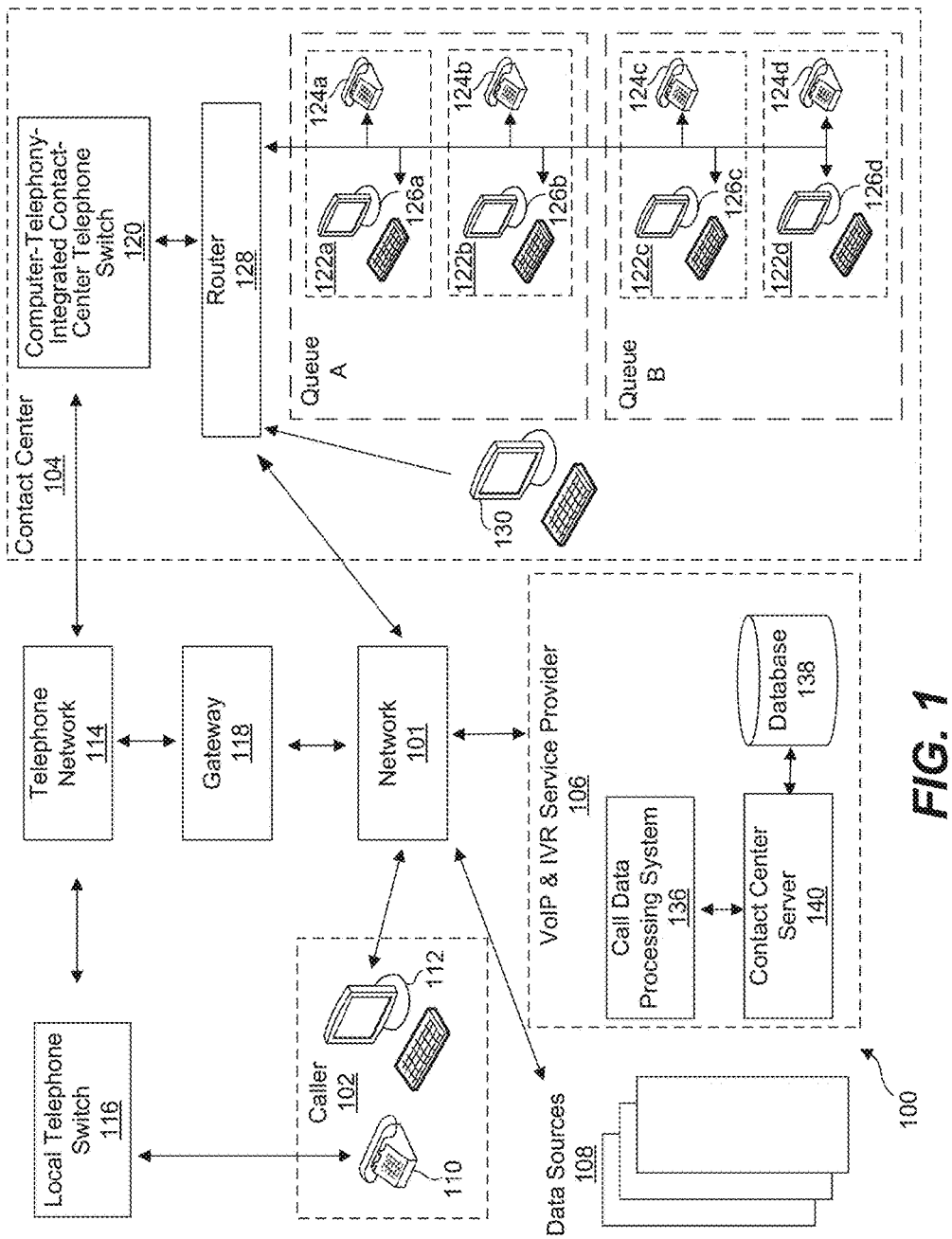
FIG. 1 is a diagram of an example system environment of a contact center in which various implementations described herein may be practiced.

Reference will now be made in detail to the example embodiments implemented according to the present disclosure, the examples of which are illustrated in the accompanying drawings. Wherever possible, the same reference numbers will be used throughout the drawings to refer to the same or like parts.

In a contact center system, the number of incoming calls may vary at different time, and the number of available agents answering customer calls may also be different as time varies. The service level of the contact center drops when the number of available agents is limited and the number of incoming calls is high. The supervisor at the contact center may wish to be notified when certain events occur, e.g., when the service level of the contact center drops below a certain level. In some embodiments, the supervisor may communicate with agents of the contact center via a collaboration environment to exchange messages with one another. The supervisor may receive notifications from the contact center via the collaboration environment when the service level drops below a certain threshold. In some embodiments, the supervisor may provide an input identifying at least one condition associated with a service level at the contact center for receiving notifications. For example, the at least one condition may include a threshold of a call waiting time at the contact center and/or a threshold of a number of calls currently being on held at the contact center.

Advantageously, the disclosed embodiments allow a user of the collaboration environment, such as the supervisor at the contact center, to receive notifications when an event meeting a preconfigured condition occurs at the contact center. The disclosed embodiments further identify behavior patterns of agents or call patterns at the contact center, and predict an occurrence of an event meeting the preconfigured condition based on the behavior patterns, such that appropriate actions may be taken before the service level actually falls under the threshold.

Example embodiments of the present disclosure provide systems and methods for managing events at a contact center. Consistent with disclosed embodiments, a contact center server may receive an input from a user identifying at least one condition associated with a service level at the contact center, the at least one condition including at least a threshold of a call waiting time at the contact center. The contact center server may detect an occurrence of an event meeting one of the at least one condition. In response to the detecting, the contact center server may provide a notification to a device associated with the user and operating in a collaboration environment, thereby notifying the occurrence of the event.

The embodiments herein include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

FIG. 1 shows an example of a system environment 100 of a contact center in which various implementations as described herein may be practiced. System environment 100 includes, for example, a network 101, one or more caller 102, one or more contact center 104, Voice over Internet Protocol (VoIP) & interactive voice response (IVR) service provider 106 ("service provider 106"), and one or more data sources 108. While in the present example embodiment the VoIP & IVR service provider 106 are depicted as a single component, in other implementations, the VoIP & IVR service providers may be separate entities. Further, while in FIG. 1 the service provider 106 is depicted as being located separately from the contact center 104, in other implementations, the service provider 106 may reside within the contact center 104.

Network 101 facilitates communication between various components of system environment 100. Network 101 may be an electronic network. Components of system environment 100 may be configured to receive data over network 101, process/analyze queries and data. Examples of network 101 include a local area network (LAN), a wireless LAN (e.g., a "WiFi" network), a wireless Metropolitan Area Network (MAN) that connects multiple wireless LANs, a wide area network (WAN) (e.g., the Internet), and a dial-up connection (e.g., using a V.90 protocol or a V.92 protocol). In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, the electronic network may also include one or more mobile device networks, such as a Long Term Evolution (LTE) network or a Personal Communication Service (PCS) network, that allow mobile devices to send and receive data via applicable communication protocols, including those described above. Further, components in system environment 100 may operate and/or interact with one or more host servers and one or more user devices for the purpose of implementing features described herein.

In this example, caller 102 is a person seeking service from contact center 104. While only one caller 102 is illustrated in FIG. 1, one of ordinary skill in the art would appreciate that one or more callers may be part of system environment 100. Caller 102 may attempt to communicate with contact center 104 using one or more telephonic devices, such as a Public Switched Telephone Network (PSTN) telephone, a mobile telephone, or another type of telephone. Such telephonic device may be represented by caller telephone 110 ("caller phone 110"). Caller 102 may attempt to communicate with contact center 104 using a device that may or may not connect directly to a PSTN, such as desktop computer, VoIP telephone, videoconferences devices, or another type of device. Such device may be represented by caller device 112. Caller phone 110 may be connected to a telephone network 114 via a local telephone switch 116. Local telephone switch 116 may be, for example, an automated call distributor or a private branch exchange switch. Telephone network 114 may be a private or public telephone carrier network (e.g., a PSTN). A gateway 118 may connect telephone network 114 with network 101 to provide cross communication between the two networks.

If caller 102 attempts to communicate with contact center 104 over telephone network 114, a connection for signal transfer will be made between caller phone 110 and a computer-telephony-integrated contact-center telephone switch 120 ("contact-center telephone switch 120"). Call-center agents 122a-d ("agents 122a-d") may have agent telephonic devices 124a-d (e.g., VoIP telephones) and agent non-telephonic devices 126a-d (e.g., a desktop computer) connected to a router 128 that facilitates communication between agent telephonic devices 124a-d, agent non-telephonic devices 126a-d, caller phone 110, and caller device 112. Router 128 may be, for example, a Power of Ethernet switch. In certain embodiments, agents 122a-d may be assisting callers that were routed different call queues. For example, agents 122a and 122b may be answering callers routed to Queue A, whereas agents 122c and 122d may be answering callers routed to Queue B. Queue A may be, for example, a queue for callers looking to get assistance with billing inquiries and Queue B may be, for example, a queue for callers looking to get assistance with technical-support inquiries.

In addition to the devices described above, a supervisor station 130 may be connected to network 101 via router 128. Supervisor station 130 may be a device (e.g., desktop computer) from which a web application may be accessed over network 101 using a web browser (not shown). Web application may be hosted on one or more web server managed by service provider 106.

A call-data processing system 136, in one implementation, generates web application data from call data that it may acquire from data sources 108 over network 101. Data sources 108 are servers that store call data and other data, such as call agent patterns, call patterns, and other relevant contact center information. Data sources 108 may be managed by service provider 106 or by third parties. Contact center server 140 provides a variety of data or services, such as voice, messaging, real-time audio/video, to users of contact center 104, such as a supervisor or agent at the contact center. Contact center server 140 may retrieve statistics and other information pertaining to the operation of contact center 104 from call-data processing system 136 and/or database 138. Contact center server 140 may receive web application data from processing system 136 and may use the web application data to generate statistic displays and other information pertaining to the operation of contact center 104. For example, contact center server 140 may generate one or more figures, diagrams, tables, or charts to assist an operator of supervisor station 130 in monitoring the operation of contact center 104 and managing contact center 104. These displays may be rendered by a web browser on supervisor station 130. Contact center server 140 may be a single server or may be configured as a distributed computer system including multiple servers, server farms, clouds, or computers that interoperate to perform one or more of the processes and functionalities associated with the disclosed embodiments.

Database 138 is configured to store call data associated with contact center 104 and communication content between users of the contact center. In some embodiments, database 138 is stored in a cloud-based server (not shown) that is accessible by the contact center server 140 and/or devices associated with users of contact center through the network 101.

Figure 2:
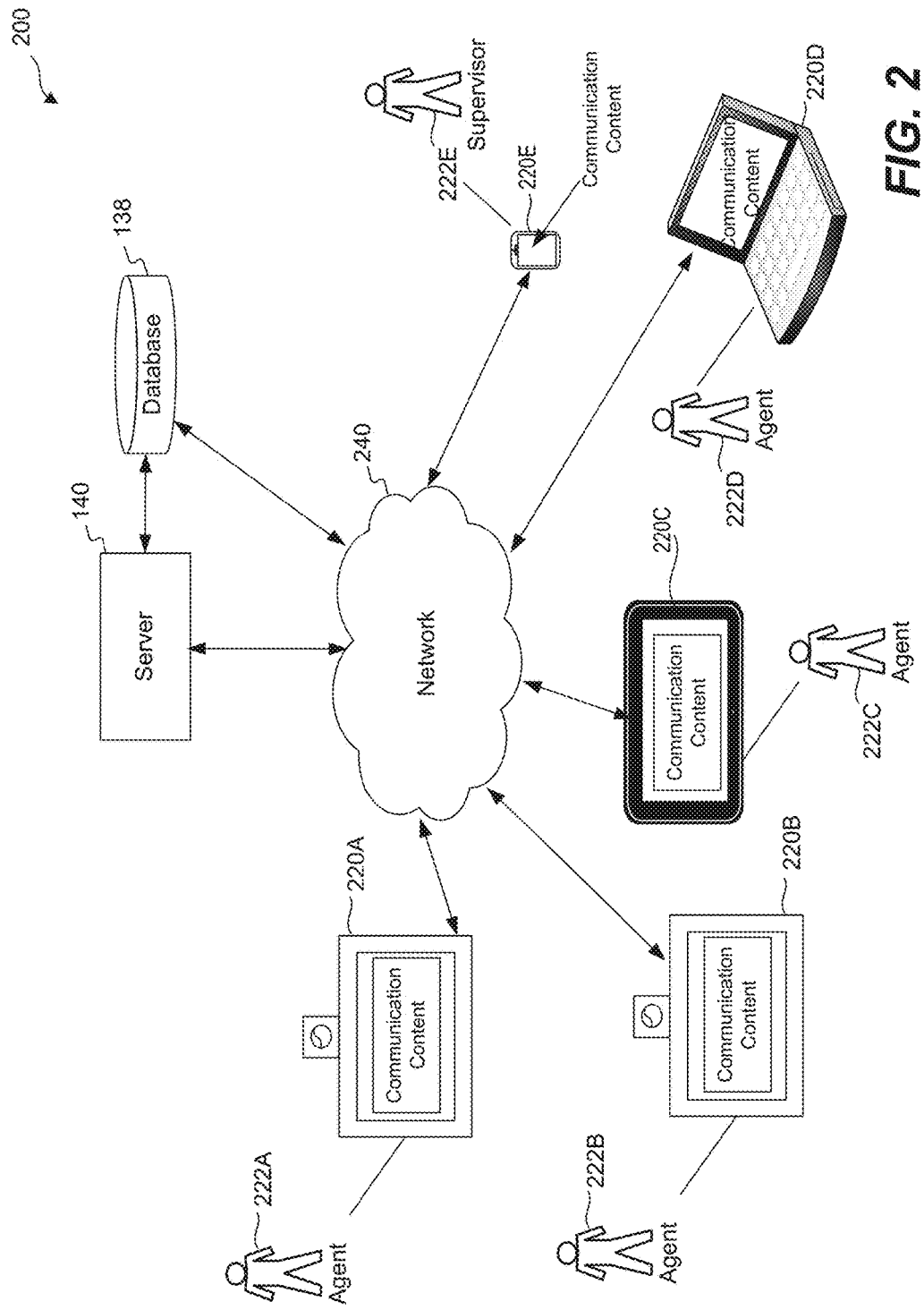
FIG. 2 is a diagram of an example of a collaborative communication system in which various implementations described herein may be practiced.

FIG. 2 shows an example of a collaborative communication system 200 in which various implementations described herein may be practiced. Collaborative communication system 200 enables a plurality of users of contact center 104, such as supervisors and agents of the contact center, to exchange messages with one another via the associated user devices. In some examples, one or more components of collaborative communication system 200, such as contact center server 140, can be used to implement computer programs, applications, methods, processes, or other software to perform the described techniques and to realize the structures described herein.

As shown in FIG. 2, collaborative communication system 200 includes a plurality of user devices 220A-220E associated with a plurality of users 222A-222E of contact center respectively. Collaborative communication system 200 is a collaborative environment that allows a group of participants (e.g., one or more users 222A-222E of contact center) using associated user devices (e.g., one or more user devices 220A-220E) to engage in communications, such as instant messaging (IM), chat, email, voice over IP (VoIP) phone call, audio or video conferencing, etc., as well as sharing communication content associated with the collaboration such as data files, images, audio/video content, etc. The components and arrangements shown in FIG. 2 are not intended to limit the disclosed embodiments, as the system components used to implement the disclosed processes and features can vary.

The network 240 facilitates communications and sharing of content between the user devices 220 and the contact center server 140. The network 240 may be any type of networks that provides communications, exchanges information, and/or facilitates the exchange of information between the contact center server 140 and user devices 220. For example, the network 240 may be the Internet, a Local Area Network, a cellular network, a public switched telephone network ("PSTN"), or other suitable connection(s) that enables collaborative communication system 200 to send and receive information between the components of collaborative communication system 200. A network may support a variety of electronic messaging formats, and may further support a variety of services and applications for user devices 220.

The contact center server 140 can be a computer-based system including computer system components, desktop computers, workstations, tablets, hand held computing devices, memory devices, and/or internal network(s) connecting the components. The contact center server 140 may be configured to receive information from user devices 220 over the network 240, process the information, store the information, and/or transmit information to the user devices 220 over the network 240. For example, contact center server 140 may be configured to receive an input from supervisor 222E identifying at least one condition associated with a service level at the contact center. The contact center server 140 may detect an occurrence of an event at the contact center meeting one of the at least one condition, and in response to the detecting, provide a notification to the user device 220E associated with the supervisor 222E notifying the occurrence of the event. As another example, contact center server 140 may be configured to receive a message sent from device 220E associated with supervisor 222E of the contact center and forward the message to device 220A-220D associated with agents 222A-222D of the contact center.

The database 138 includes one or more physical or virtual storages coupled with the contact center server 140. The database 138 is configured to store communications such as video/audio messages, documents, or shared content among users 222A-222E. The database 138 may be adapted to store analytics of calls at contact center 104, such as average answering time, average handling time, current calls in queue, number of agents logged in the contact center, number of unavailable agents, and so on. The database 138 may also be adapted to store contact information of the users 222. The data stored in the database 138 may be transmitted to the contact center server 140 before or during an ongoing communication session. In some embodiments, the database 138 is stored in a cloud-based server (not shown) that is accessible by the contact center server 140 and/or the user devices 220 through the network 240. While the database 138 is illustrated as an external device connected to the contact center server 140, the database 138 may also reside within the contact center server 140 as an internal component of the contact center server 140.

As shown in FIG. 2, users 222A-222E may communicate with contact center server 140 using various types of user devices 220A-220E via network 240. As an example, user devices 220A, 220B, and 220D include a display such as a television, tablet, computer monitor, video conferencing console, or laptop computer screen. User devices 220A, 220B, and 220D may also include video/audio input devices such as a video camera, web camera, or the like. As another example, user devices 220C and 220E include mobile devices such as a tablet or a smartphone having display and video/audio capture capabilities. User devices 220A-220E may also include one or more software applications that facilitate the user devices to engage in communications, such as IM, text messages, EMAIL, VoIP, video conferences, with one another.

Figure 3:
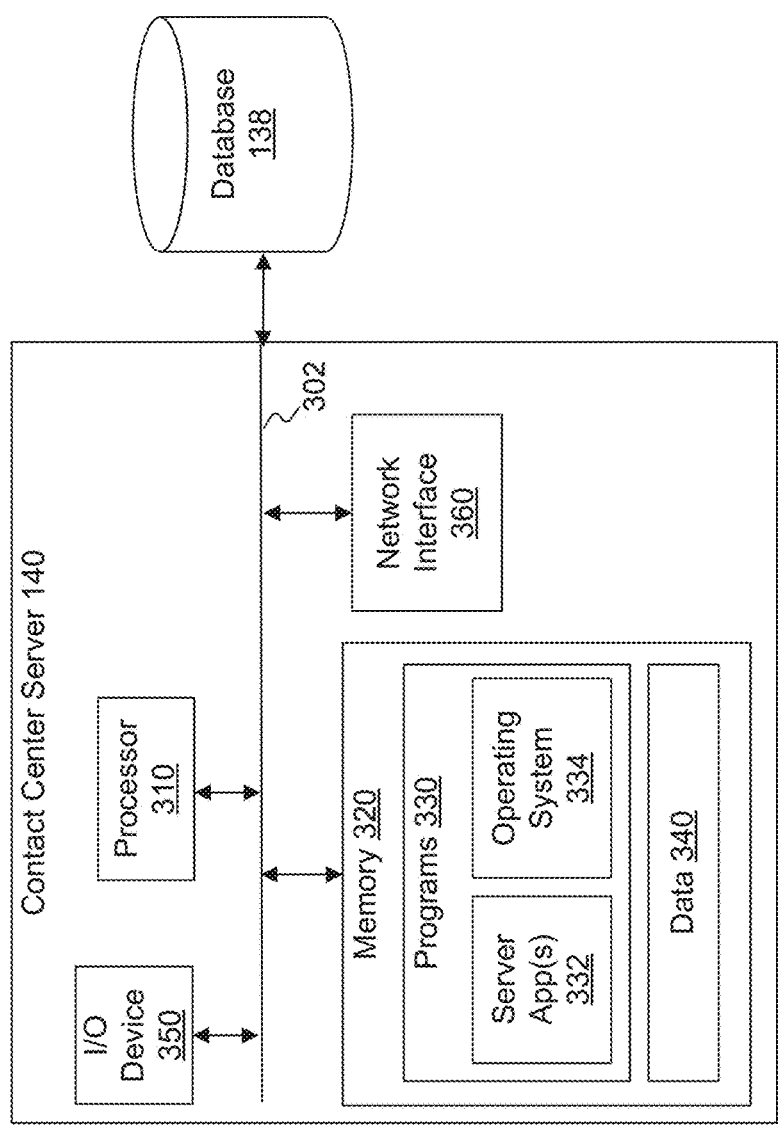
FIG. 3 is a diagram of an example contact center server, consistent with the disclosed embodiments.

FIG. 3 shows a diagram of an example contact center server 140, consistent with the disclosed embodiments. The contact center server 140 may be implemented as a specially made machine that is specially programmed to perform functions relating to managing events at a contact center. The special programming at the contact center server 140 enables the contact center server to receive an input from a user identifying at least one condition associated with a service level at the contact center and to provide a notification to a device associated with the user when an occurrence of an event meeting one of the at least one condition is detected.

The contact center server 140 includes a bus 302 (or other communication mechanism) which interconnects subsystems and components for transferring information within the contact center server 140. As shown, the contact center server 140 includes one or more processors 310, input/output ("I/O") devices 350, network interface 360 (e.g., a modem, Ethernet card, or any other interface configured to exchange data with a network), and one or more memories 320 storing programs 330 including, for example, server app(s) 332, operating system 334, and data 340, and can communicate with an external database 138 (which, for some embodiments, may be included within the contact center server 140). The contact center server 140 may be a single server or may be configured as a distributed computer system including multiple servers, server farms, clouds, or computers that interoperate to perform one or more of the processes and functionalities associated with the disclosed embodiments.

The processor 310 may be one or more processing devices configured to perform functions of the disclosed methods, such as a microprocessor manufactured by Intel™ or manufactured by AMD™. The processor 310 may comprise a single core or multiple core processors executing parallel processes simultaneously. For example, the processor 310 may be a single core processor configured with virtual processing technologies. In certain embodiments, the processor 310 may use logical processors to simultaneously execute and control multiple processes. The processor 310 may implement virtual machine technologies, or other technologies to provide the ability to execute, control, run, manipulate, store, etc. multiple software processes, applications, programs, etc. In some embodiments, the processor 310 may include a multiple-core processor arrangement (e.g., dual, quad core, etc.) configured to provide parallel processing functionalities to allow the contact center server 140 to execute multiple processes simultaneously. It is appreciated that other types of processor arrangements could be implemented that provide for the capabilities disclosed herein.

The memory 320 may be a volatile or non-volatile, magnetic, semiconductor, tape, optical, removable, non-removable, or other type of storage device or tangible or non-transitory computer-readable medium that stores one or more program(s) 330 such as server apps 332 and operating system 334, and data 340. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The contact center server 140 may include one or more storage devices configured to store information used by processor 310 (or other components) to perform certain functions related to the disclosed embodiments. For example, the contact center server 140 may include memory 320 that includes instructions to enable the processor 310 to execute one or more applications, such as server apps 332, operating system 334, and any other type of application or software known to be available on computer systems. Alternatively or additionally, the instructions, application programs, etc. may be stored in an external database 138 (which can also be internal to the contact center server 140) or external storage communicatively coupled with the contact center server 140 (not shown), such as one or more database or memory accessible over the network 240.

The database 138 or other external storage may be a volatile or non-volatile, magnetic, semiconductor, tape, optical, removable, non-removable, or other type of storage device or tangible or non-transitory computer-readable medium. The memory 320 and database 138 may include one or more memory devices that store data and instructions used to perform one or more features of the disclosed embodiments. The memory 320 and database 138 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, the contact center server 140 may be communicatively connected to one or more remote memory devices (e.g., remote databases (not shown)) through network 240 or a different network. The remote memory devices can be configured to store information that the contact center server 140 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

The programs 330 include one or more software modules configured to cause processor 310 to perform one or more functions of the disclosed embodiments. Moreover, the processor 310 may execute one or more programs located remotely from one or more components of the collaborative communication system 200. For example, the contact center server 140 may access one or more remote programs that, when executed, perform functions related to disclosed embodiments.

In the presently described embodiment, server app(s) 332 causes the processor 310 to perform one or more functions of the disclosed methods. For example, the contact center server app(s) 332 cause the processor 310 to receive an input from a user, such as a supervisor of a contact center, identifying at least one condition associated with a service level at the contact center, detect an occurrence of an event meeting one of the at least one condition, and in response to the detecting, provide a notification to a device associated with the user and operating in a collaboration environment, thereby notifying the occurrence of the event.

In some embodiments, the program(s) 330 may include the operating system 334 performing operating system functions when executed by one or more processors such as the processor 310. By way of example, the operating system 334 may include Microsoft Windows™, Unix™, Linux™, Apple™ operating systems, Personal Digital Assistant (PDA) type operating systems, such as Apple iOS, Google Android, Blackberry OS, or other types of operating systems. Accordingly, disclosed embodiments may operate and function with computer systems running any type of operating system 334. The contact center server 140 may also include software that, when executed by a processor, provides communications with network 240 through the network interface 360 and/or a direct connection to one or more user devices 220A-220E.

In some embodiments, the data 340 may include, for example, profiles of users of a contact center and historical communications optionally coupled with any communication content between the users. For example, the data 340 may include messages sent by the users 222A-222E and documents and audio/video files shared by the users 222A-222E. The data 340 may also include call agent behavior patterns, call patterns, and other relevant information at the contact center.

The contact center server 140 may also include one or more I/O devices 350 having one or more interfaces for receiving signals or input from devices and providing signals or output to one or more devices that allow data to be received and/or transmitted by the contact center server 140. For example, the contact center server 140 may include interface components for interfacing with one or more input devices, such as one or more keyboards, mouse devices, and the like, that enable the contact center server 140 to receive input from an operator or administrator (not shown).

Figure 4:
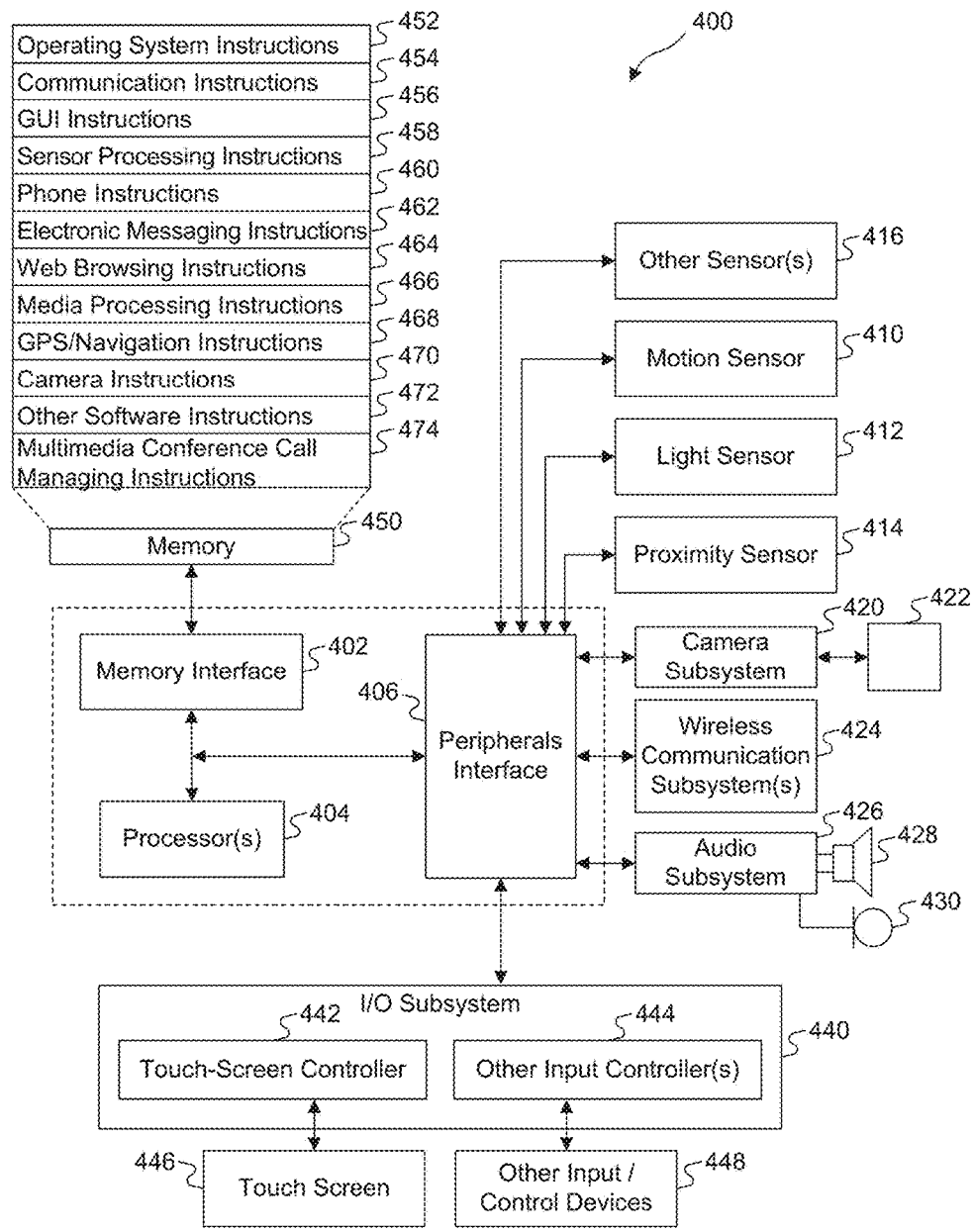
FIG. 4 is a diagram of an example user device for implementing embodiments consistent with the present disclosure.

FIG. 4 is a diagram of an example of a user device 400 for use in a collaborative communication system, such as collaborative communication system 200. The user device 400 can be used to implement computer programs, applications, methods, processes, or other software to perform embodiments described in the present disclosure, such as the user devices 220A-220E. The user device 400 includes a memory interface 402, one or more processors 404 such as data processors, image processors and/or central processing units, and a peripherals interface 406. The memory interface 402, the one or more processors 404, and/or the peripherals interface 406 can be separate components or can be integrated in one or more integrated circuits. The various components in the user device 400 can be coupled by one or more communication buses or signal lines.

Sensors, devices, and subsystems can be coupled to the peripherals interface 406 to facilitate multiple functionalities. For example, a motion sensor 410, a light sensor 412, and a proximity sensor 414 can be coupled to the peripherals interface 406 to facilitate orientation, lighting, and proximity functions. Other sensors 416 can also be connected to the peripherals interface 406, such as a positioning system (e.g., GPS receiver), a temperature sensor, a biometric sensor, or other sensing device, to facilitate related functionalities. A GPS receiver can be integrated with, or connected to, the user device 400. For example, a GPS receiver can be built into mobile telephones, such as smartphone devices. GPS software allows mobile telephones to use an internal or external GPS receiver (e.g., connecting via a serial port or Bluetooth). A camera subsystem 420 and an optical sensor 422, e.g., a charged coupled device ("CCD") or a complementary metal-oxide semiconductor ("CMOS") optical sensor, may be utilized to facilitate camera functions, such as recording photographs and video clips.

Communication functions may be facilitated through one or more wireless/wired communication subsystems 424, which includes an Ethernet port, radio frequency receivers and transmitters and/or optical (e.g., infrared) receivers and transmitters. The specific design and implementation of the wireless/wired communication subsystem 424 depends on the communication network(s) over which the user device 400 is intended to operate. For example, in some embodiments, the user device 400 includes wireless/wired communication subsystems 424 designed to operate over a GSM network, a GPRS network, an EDGE network, a Wi-Fi or WiMax network, and a Bluetooth® network.

An audio subsystem 426 may be coupled to a speaker 428 and a microphone 430 to facilitate voice-enabled functions, such as voice recognition, voice replication, digital recording, and telephony functions.

The I/O subsystem 440 includes a touch screen controller 442 and/or other input controller(s) 444. The touch screen controller 442 is coupled to a touch screen 446. The touch screen 446 and touch screen controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 446. While a touch screen 446 is shown in FIG. 4, the I/O subsystem 440 may include a display screen (e.g., CRT or LCD) in place of the touch screen 446.

The other input controller(s) 444 is coupled to other input/control devices 448, such as one or more buttons, rocker switches, thumb-wheel, infrared port, USB port, and/or a pointer device such as a stylus. The touch screen 446 can, for example, also be used to implement virtual or soft buttons and/or a keyboard.

The memory interface 402 is coupled to memory 450. The memory 450 includes high-speed random access memory and/or non-volatile memory, such as one or more magnetic disk storage devices, one or more optical storage devices, and/or flash memory (e.g., NAND, NOR). The memory 450 stores an operating system 452, such as DRAWIN, RTXC, LINUX, iOS, UNIX, OS X, WINDOWS, or an embedded operating system such as VXWorkS. The operating system 452 can include instructions for handling basic system services and for performing hardware dependent tasks. In some implementations, the operating system 452 can be a kernel (e.g., UNIX kernel).

The memory 450 may also store communication instructions 454 to facilitate communicating with one or more additional devices, one or more computers and/or one or more servers. The memory 450 can include graphical user interface instructions 456 to facilitate graphic user interface processing; sensor processing instructions 458 to facilitate sensor-related processing and functions; phone instructions 460 to facilitate phone-related processes and functions;

electronic messaging instructions 462 to facilitate electronic-messaging related processes and functions; web browsing instructions 464 to facilitate web browsing-related processes and functions; media processing instructions 466 to facilitate media processing-related processes and functions; GPS/navigation instructions 468 to facilitate GPS and navigation-related processes and instructions; camera instructions 470 to facilitate camera-related processes and functions; and/or other software instructions 472 to facilitate other processes and functions. The memory 450 may also include multimedia conference call managing instructions 474 to facilitate conference call related processes and instructions.

In some embodiments, the communication instructions 454 include software applications to facilitate connection with the contact center server 140 that provide service for a contact center, and the graphical user interface instructions 456 may include a software program that facilitates a user associated with the user device to receive messages from the contact center server 140, provide user input, and so on. The graphical user interface instructions 456 may include a software program that facilitates display of information pertaining to the operation of contact center to a user associated with the user device and facilitates the user to provide user input, and so on.

Each of the above identified instructions and applications may correspond to a set of instructions for performing one or more functions described above. These instructions need not be implemented as separate software programs, procedures, or modules. The memory 450 may include additional instructions or fewer instructions. Furthermore, various functions of the user device 400 may be implemented in hardware and/or in software, including in one or more signal processing and/or application specific integrated circuits.

Figure 5:
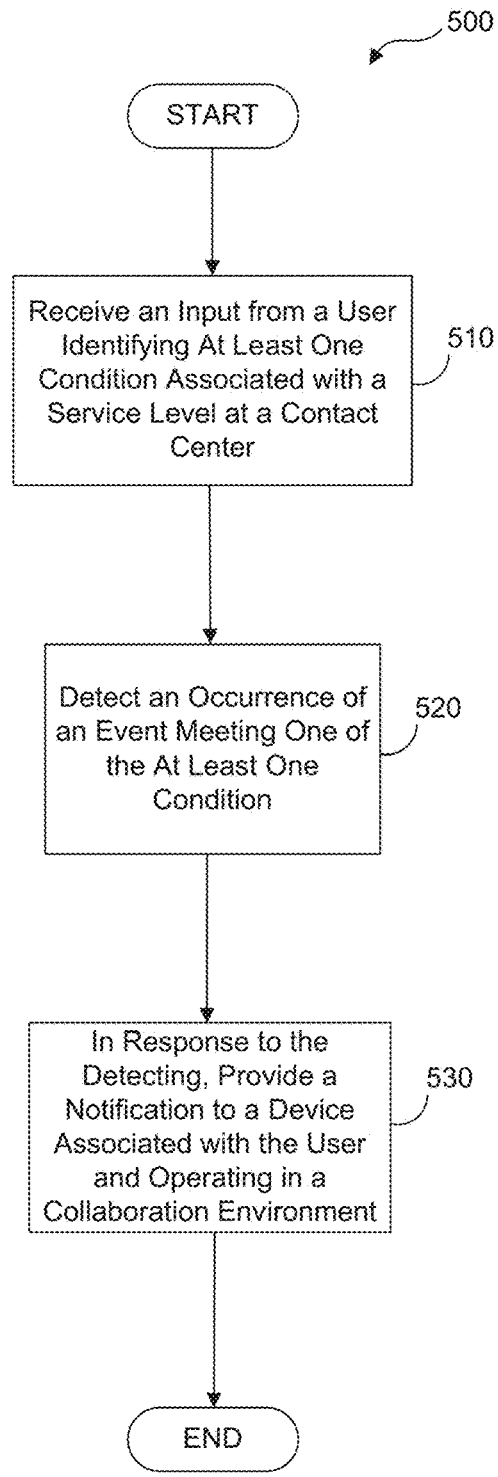
FIG. 5 is a flowchart of an example process for managing events at a contact center, in accordance with embodiments of the present disclosure.

FIG. 5 is a flowchart of an example process 500 for managing events at a contact center, in accordance with embodiments of the present disclosure. The steps associated with this example process may be performed by, for example, a processor of the contact center server 140 of FIG. 1. The example process 500 allows a user of a contact center, such as a supervisor, to configure a condition associated with a service level at the contact center and to be notified when an event meeting the condition occurs at the contact center. For example, a supervisor of the contact center may send a user input via a user device to the contact center server 140 requesting a notification to be sent when the number of callers on hold is exceeding a preset threshold. The user input may specify additional information to be included in the notification, such as the number of agents logged in the contact center, the average call handling time, and so on. As another example, the supervisor may receive another notification via the user device when the preset condition no longer occurs at the contact center, e.g., when the service level goes back to normal.

In step 510, the contact center server receives an input from a user identifying at least one condition associated with a service level at the contact center. For example, the user may be a supervisor at the contact center, and the at least one condition may include a threshold of a call waiting time at the contact center. As another example, the at least one condition may also include a threshold of a number of calls currently being on held at the contact center, a threshold of a talk time, and so on.

In some embodiments, the user may provide the input via a user device associated with the user which operates in a collaboration environment, such as the user device 220A-220E shown in FIG. 2. For example, the user device may provide an interface for the user to select a number of conditions for receiving notifications. In other embodiments, the user may provide the input via a work station at the contact center, such as the supervisor station 130 shown in FIG. 1. For example, the user of contact center may input the condition for receiving a notification via a workstation at the contact center, where the input may indicate the device for receiving the notification, such as a mobile device associated with the user.

In some embodiments, the input from the user may indicate information to be included in the notification. For example, the user input may request to include the number of agents logged in the contact center and the number of available agents at the contact center in the notification. In some embodiments, the user input may include a time range associated with the condition at the contact center. For example, the user input may indicate a time range for the specified condition to occur at the contact center for any notification to be sent.

In step 520, the contact center server detects an occurrence of an event meeting one of the at least one condition. For example, the contact center server may maintain a Call Detail Record (CDR) which provides call metadata about each telephonic event such as the event's time, duration, completion status, source number, and destination number. The CDR may provide call metadata through a sequence of records such as an Apache Kafka commit log. The contact center server may obtain real time quality of service data based on the CDR. As another example, the contact center server may monitor the status of the calls at the agent stations and gather statistical information of calls at the contact center continuously. In some implementations, the contact center server may gather statistical information of calls at the contact center at a preset time interval, and detect an occurrence of an event, e.g., a prolonged call waiting time for a large number of calls, at the end of preset time interval. The contact center server may also gather statistical information of calls upon receiving a request from a user of the contact center.

In some embodiments, the contact center server may identify behavior patterns of agents and/or call patterns at the contact center and predict the occurrence of the event meeting one of the at least one condition based on the behavior patterns. For example, the contact center server may collect statistical information at the call center at certain time periods, such as the number of incoming calls, average waiting time to answer a call, and/or time to average call handling time. The contact center server may predict an increase of unanswered calls based on this information. As another example, the contact center server may record the login time of each agent at the contact center and identify that at a certain time period of a day, such as during lunch time or afternoon break, a number of agents will temporarily log off their work stations, resulting in decrease of quality of service. The contact center server may predict the occurrence of the event meeting one of the at least one condition based on the identified behavior pattern of the agents and/or outside events. For example, the contact center server may identify that the number of calls being on held increases and the quality of service degrades during 3:00-3:30 pm each day. The contact center server may then predict that an event meeting one of the at least one condition is likely to occur during this time period. As another example, the contact center server may identify that a technical outage (such as an electricity or internet outage) occurs at the contact center and/or outside the contact center (e.g. third party service provider), and it will likely result in an increased number of incoming calls and in turn degraded quality of service at the contact center. In some implementations, the contact center server may determine a likelihood of the occurrence of the event meeting one of the at least one condition and provide the estimation to the user. In doing so, the user will have an understanding of how likely the event is about to occur and take appropriate action based on the estimated likelihood. The contact center server may assign weights to different quality of service metrics, such as average call waiting time, number of call being on held, average call handling time, and estimate the likelihood of the occurrence of the event meeting one of the at least one condition based on the assigned weights.

In some embodiments, the contact center server may detect that the at least one condition associated with the service level at the contact center is no longer met. After detecting the occurrence of the event meeting one of the at least one condition, the contact center server may continue to monitor the call status and collect statistical information of calls at the contact center. For example, the user at the contact center may take actions to enhance the quality of service after the occurrence of the event, and after a certain period of time, the contact center server may detect that the at least one condition associated with the service level at the contact center is no longer met. In some embodiments, the contact center server may identify behavior patterns of agents at the contact center and predict that the event meeting one of the at least one condition will end based on the behavior patterns. For example, the contact center server may record the login time of each agent at the contact center and identify that at after a certain time period of a day, such as after lunch time or afternoon break, a number of agents will return to their work stations, resulting in an improvement of quality of service. The contact center server may predict the at least one condition associated with the service level at the contact center will no longer be met based on the identified behavior pattern of the agents. For example, the contact center server may identify that the number of calls being on held increases and the quality of service degrades during 3:00-3:30 pm each day, and that after 3:30 pm, the number of calls being on held decreases and the quality of service returns to normal. The contact center server may then predict that the event meeting one of the at least one condition is likely to end after 3:30 pm each day.

In step 530, in response to the detecting, the contact center server provides a notification to a device associated with the user and operating in a collaboration environment, thereby notifying the occurrence of the event. For example, the user may exchanges message with other users associated with the contact center via the collaboration environment using a mobile device, and the contact center server may send the notification to the mobile device. In some embodiments, the notification may include current statistical information of calls at the contact center, showing the occurrence of the event meeting one of the at least one condition. The notification may also include additional information at the contact center, such as the number of agents logged in, the number of available agents, or information the user requested to be included in the notification. The notification may also indicate the specific queue in which the event occurs, for example, the caller queue for technical-support inquiries. In some embodiments, the notification may be provided to a plurality of devices associated with the user, such as a mobile device and a workstation at the contact center.

In some embodiments, the contact center server may predict the occurrence of the event meeting one of the at least one condition and provide a notification to the device notifying the predicted occurrence of the event. For example, based on the behavior patterns of one or more agents associated with the contact center, the contact center server may determine a likelihood of the occurrence of the event meeting one of the at least one condition and provide the estimation to the user in a notification. The notification may be sent to the device in advance of the predicted occurrence of the event such that the user may take appropriate actions before the predicted event occurs.

In some embodiments, the contact center server may detect that the event meeting one of the at least condition no longer exist and may provide a notification to the device notifying that the service level of the contact center is back to normal. For example, the notification may indicate the current service level of the contact center, such as the average call answering time, the number of calls being on held, and so on. The notification may also include additional information of the contact center, such as the number of agents logged into the contact center, the number of unavailable agents, etc. In some embodiments, the contact center server may predict that the event meeting one of the at least one condition will end based on the behavior patterns of the agents and provide a notification to the device notifying the predicted termination of the event.

In the present disclosure, the device associated with the user operates in a collaborative communication environment with devices associated with other users. For example, the user may be a supervisor of the contact center who exchanges messages with other users of the contact center, such as agents, using the device. For example, the supervisor and agents of the contact center may exchange messages, documents, audio or video content, gaming, and otherwise interact with one another in real-time using associated user devices. The process 500 allows the user to receive notifications via an associated device operating in the collaborative communication environment without having to log onto the work station at the contact center.

In some embodiments, the contact center server may provide an interface for the user to send one or more messages to one or more agents associated with the contact center via the collaboration environment. For example, in response to detecting an occurrence of an event meeting one of the at least one condition, the contact center server may provide an interface that allows the user to send messages to agents that are currently offline to bring them back to handle calls at the contact center. The interface may allow the user to send a message to the offline agents in a single action at substantially the same time without having to send a message to each of the agents separately. As another example, in response to detecting that the event meeting one of the at least one condition no longer exists, the contact center server may provide an interface that allows the user to send messages to agents that are currently logged in their work stations to log off and switch to other tasks at the contact center.

In some embodiments, the contact center server may provide suggestions to the user in response to detecting an occurrence of an event meeting one of the at least one condition. For example, the contact center server may identify agents that are currently performing other tasks at the contact center and suggest these agents to the user for bringing additional agents at the contact center to answer calls. The contact center server may suggest these agents in the notification or in an interface that allows the user to contact these agents. As another example, the contact center server may identify an increasing number of calls in a specific queue, for example, a queue for callers looking to get assistance with technical-support inquiries, and may suggest agents that specialize in the technical support subjects to the user for bringing additional agents at the contact center to answer calls. The contact center server may also detect that the service level of one caller queue drops while there are a number of agents responsible for another caller queue are currently idle, and may suggest shifting the idle agents in another caller queue to the queue that requires additional assistance.

In some embodiments, the contact center server may, based on the user's activities in the past, provide suggestions to the user in response to detecting an occurrence of an event meeting one of the at least one condition. For example, the contact center server may identify the agents the user brought back to the contact center when similar events occurred in the past, and suggest these agents to the user in response to detecting an occurrence of an event meeting one of the at least one condition. As another example, the contact center server may identify the agents the user contacted most frequently in the past weeks who are also currently offline, and suggest these agents to the user in response to detecting an occurrence of an event meeting one of the at least one condition. Thus, for different users, such as different supervisors at the contact center, the suggestions provided by the contact center server may differ based on the users' activities in the past.

In some embodiments, the contact center server may, based on the user's position at the contact center, provide suggestions to the user in response to detecting an occurrence of an event meeting one of the at least one condition. For example, the contact center server may identify that the user is a supervisor of the contact center and suggest to the user additional agents who may be brought to answer calls in response to detecting an occurrence of an event meeting one of the at least one condition associated with a service level at the contact center. As another example, the contact center server may identify that the user is a high level executive of the contact center and suggest to the user supervisors who are responsible for quality of service at the contact center for resolving the workflow issues, in response to detecting an occurrence of an event meeting one of the at least one condition.

In some embodiments, the notification may be provided to the user only if the user satisfies a predefined criterion. For example, the notification may be only available to supervisors at the contact center and may not be available to other personnel at the contact center. As another example, the notification may be only provided to supervisors with expertise in resolution of issues relating to the event. In some implementations, the notification may be provided to both supervisors and agents of the contact center. The contact center server may identify whether the user is permitted to receive notifications and provide a notification only if there is permission.

In some embodiments, the user may send an input to the contact center server requesting to receive various notifications under various conditions at the contact center. For example, the user input may request to receive notifications either when the average call waiting time at the contact center is above a certain threshold or when the number of agents logged in their workstations is below a certain threshold. The user may assign different priority levels for these two types of notifications. For example, the user may assign a high priority for notification in connection with the event that the average call waiting time at the contact center is above a certain threshold, and assign a low priority for notification in connection with the event that the number of agents logged in their workstations is below a certain threshold. For the notifications assigned with a high priority, the contact center server may keep sending the notifications to the user periodically in a relatively short time interval until the event no longer exists. For the notifications assigned with a low priority, the contact center server may only send the notification once to the user upon detecting the occurrence of the event, or send the notification to the user periodically in a longer time interval until the event no longer exists. In some implementations, for the notifications assigned with a high priority, the contact center server may send the notifications to multiple devices associated with the user, such as the mobile device, the workstation, and other devices associated with the user recorded by database. For the notifications assigned with a low priority, the contact center server may only send the notification to one device associated with the user, such as the workstation at the contact center.

FIGS. 6A-6F illustrate an example user interface for managing events at a contact center, in accordance with embodiments of the present disclosure. The example diagrams depicted in FIGS. 6A-6F illustrate embodiments in which a user of a contact center identifies conditions associated with a service level at the contact center for receiving notifications. The diagrams depicted in FIGS. 6A-6F are examples only and are not intended to be limiting.

Figure 6A:
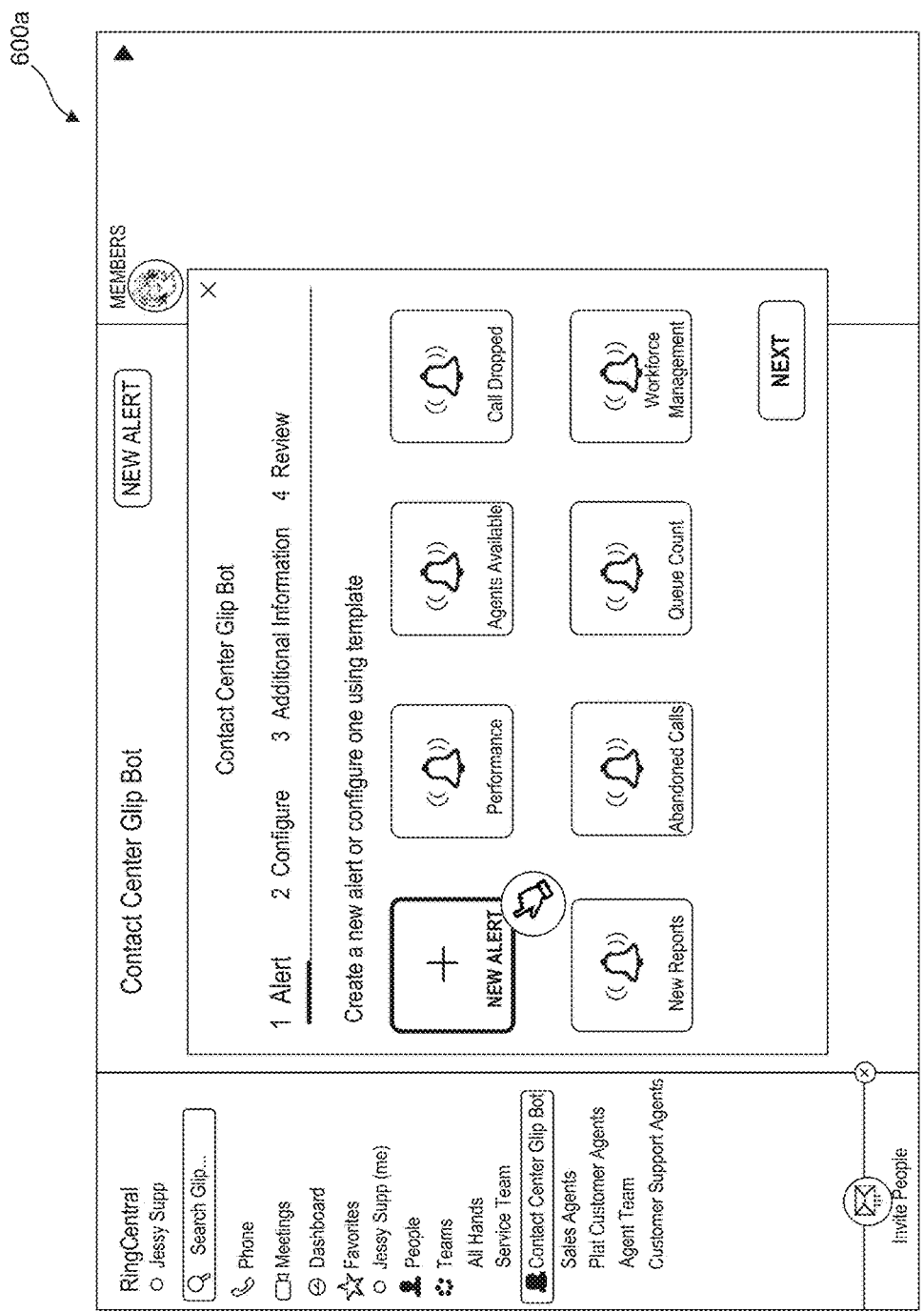
FIGS. 6A-6F illustrate an example user interface for managing events at a contact center, in accordance with embodiments of the present disclosure.

FIG. 6A shows a display 600a on a device (such as a workstation at a contact center or a mobile device) associated with a user. As shown in FIG. 6A, the device operates in a collaboration environment, where the user may exchange messages and/or share contents with other members of the contact center, such as sales agents, platinum customer agents, and customer support agents. The user may also invite other people to the collaboration environment by selecting the icon "Invite People." The contact center in this example provides more than one level of service with, for example, higher valued customers designated as "Platinum" customers. Higher valued customers typically receive service from a distinct pool of one or more agents, referred to as "Platinum Agents" or "Plat Agents."

As shown in FIG. 6A, the interface may allow the user to perform various tasks in connection with the contact center, such as creating a new alert, view performance of the contact center, conduct workforce management, and so on. To receive notifications from the contact center server, the user may create a new alert by selecting the icon "New Alert" under the "Alert" tab.

Figure 6B:
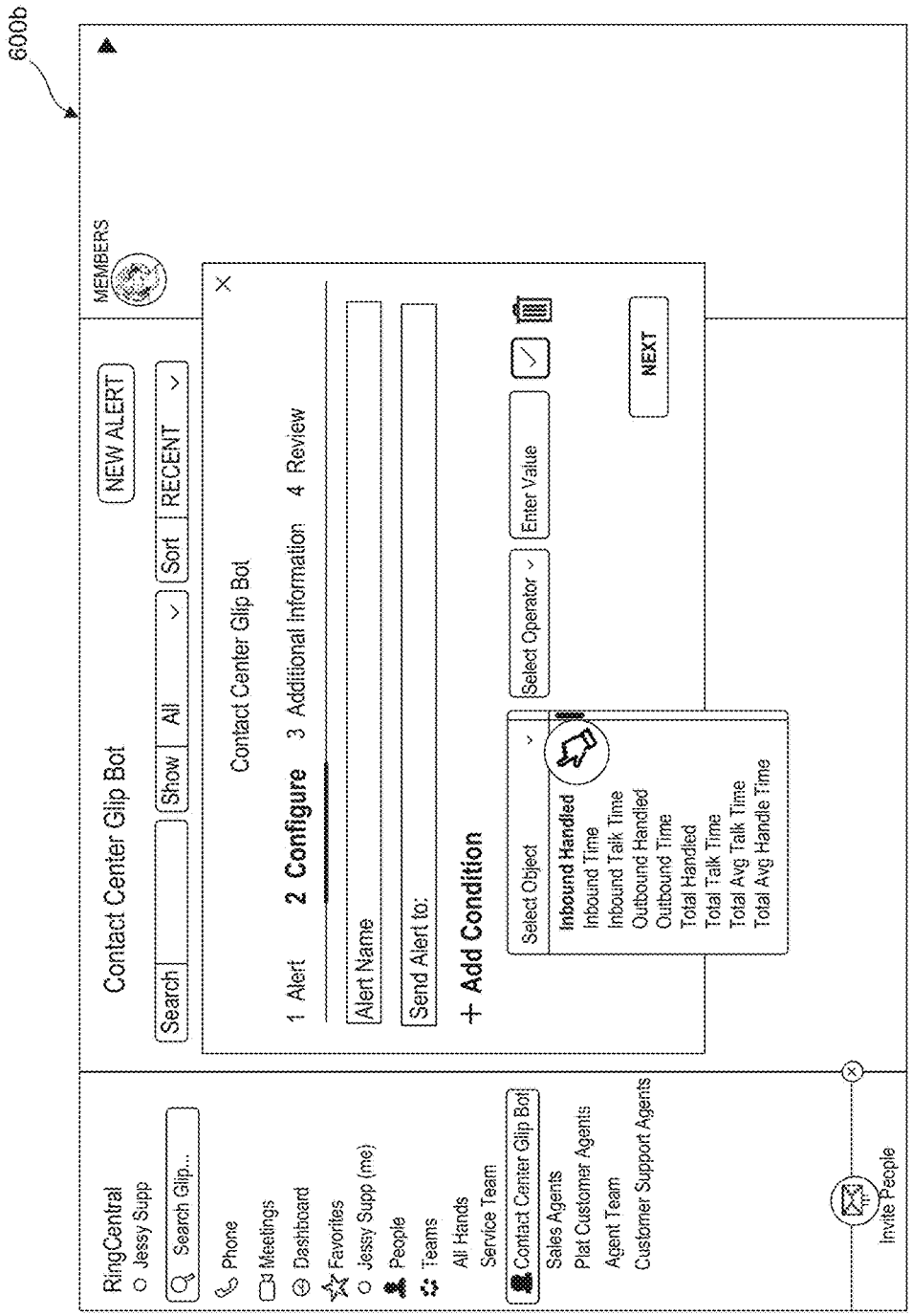

FIG. 6B shows another display 600b on a device (such as a workstation at a contact center or a mobile device) associated with a user. As shown in FIG. 6B, the user may configure the device to receive the notification and the condition for receiving the notification. For example, the condition may be associated with one of the objects, such as inbound handled, inbound time, inbound talk time, outbound handled, outbound time, and so on. As shown in FIG. 6B, the user selects inbound handled as the objection of condition for receiving notifications.

Figure 6C:
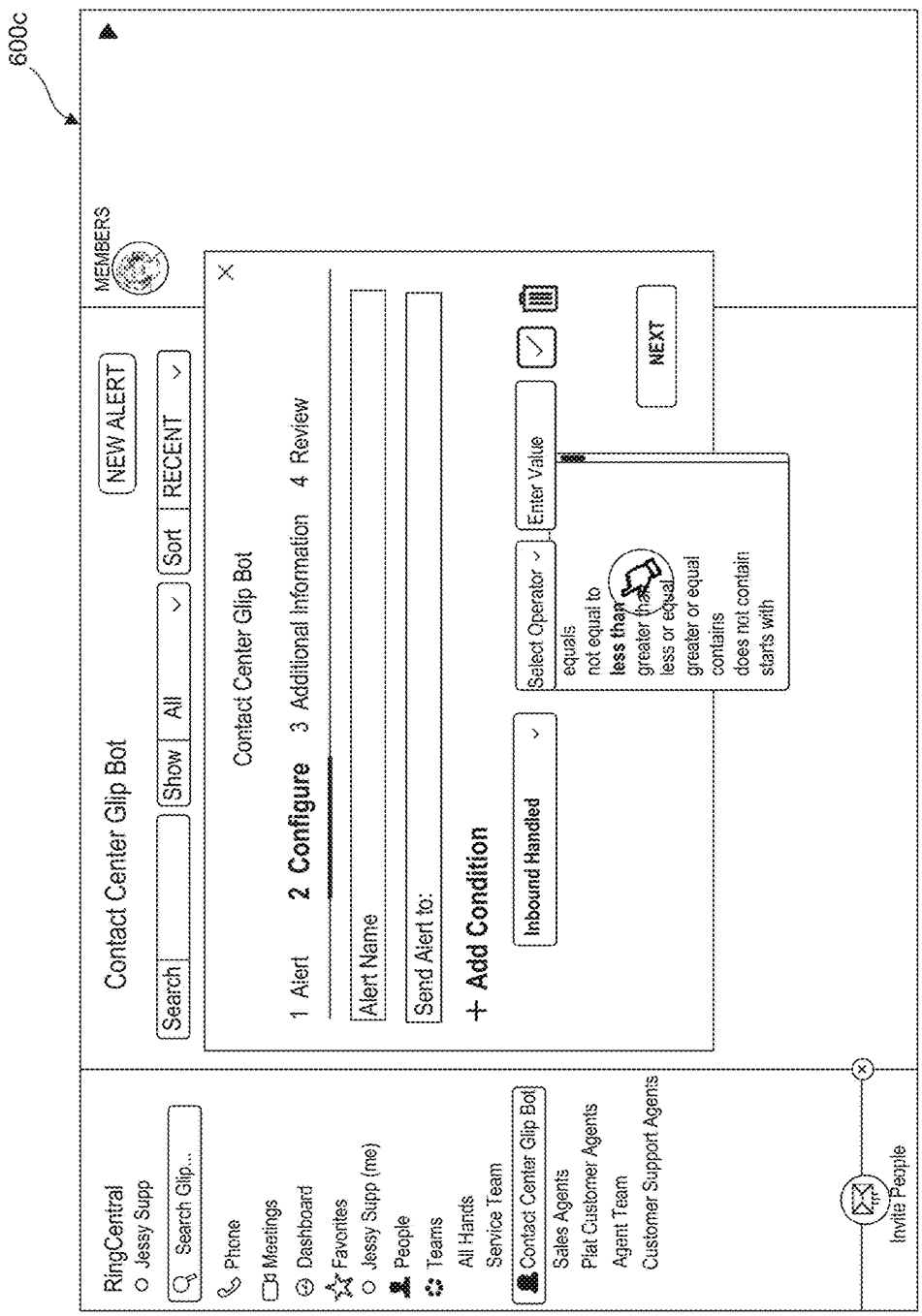

FIG. 6C shows another display 600c on a device (such as a workstation at a contact center or a mobile device) associated with a user. As shown in FIG. 6C, the user selects an operator for the condition for receiving notifications. For example, the operator may be "equals," "not equal to," "less than," "greater than," or the like. In this example, the user selects "less than" as the operator for the condition for receiving notifications. The user may also enter the value associated with the object "inbound handled" of the condition via the user interface.

Figure 6D:
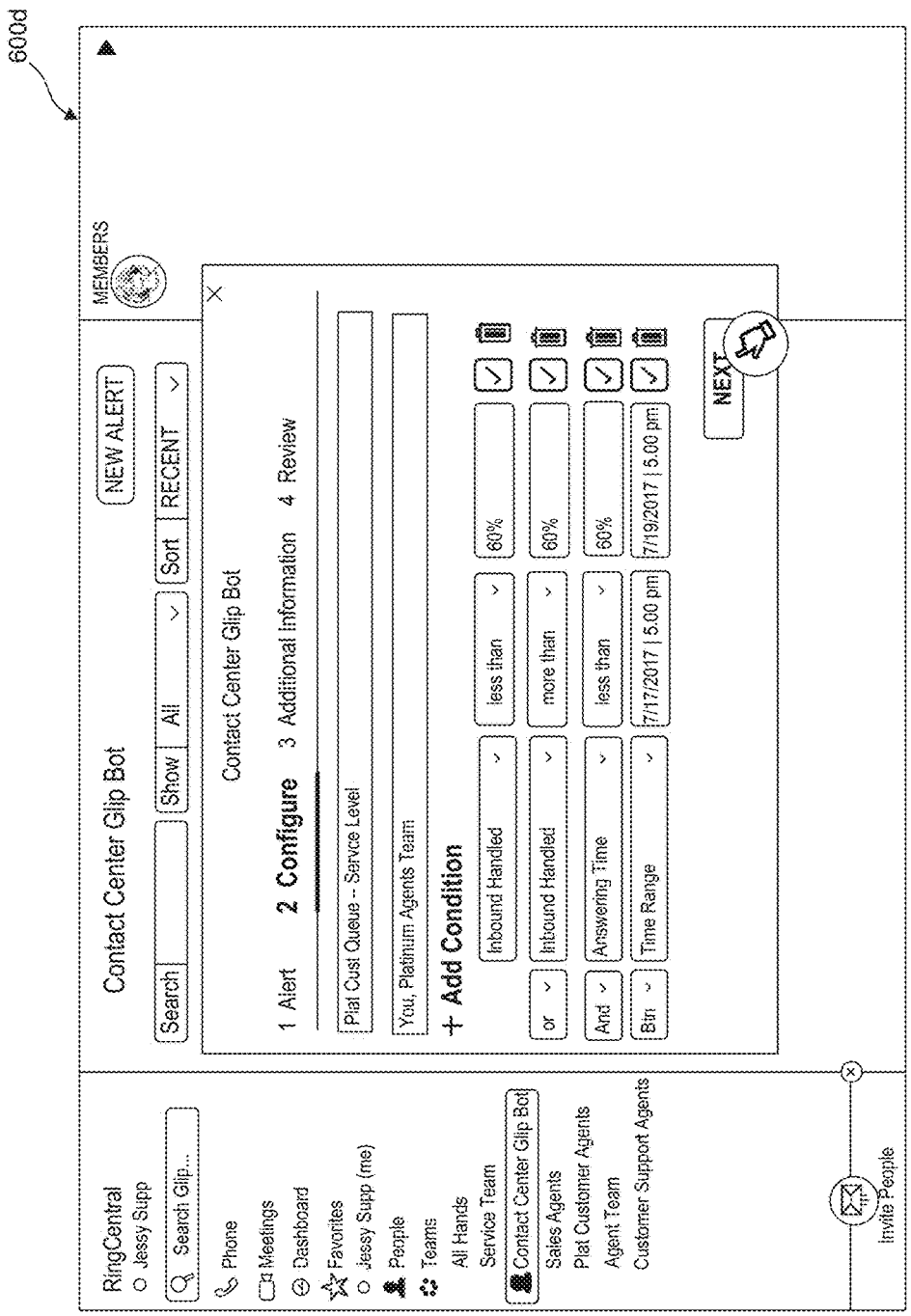

FIG. 6D shows another display 600d on a device (such as a workstation at a contact center or a mobile device) associated with a user. As shown in FIG. 6D, the user configures the name of the notification as "Plat Cust Queue—Service Level," and configures the notification to be sent to the user and to the platinum agents team. The user interface also allows the user to add one or more condition for receiving the notification. In this example, the user configures the conditions as either "inbound handled less than 60%" or "inbound handled more than 60% and answering time less than 60%." The user interface may also allow the user to set a time range for the occurrence of the event for receiving notifications. For example, the user may configure the time ranges as between July 17, 5:00 pm and July 19, 5:00 pm.

Figure 6E:
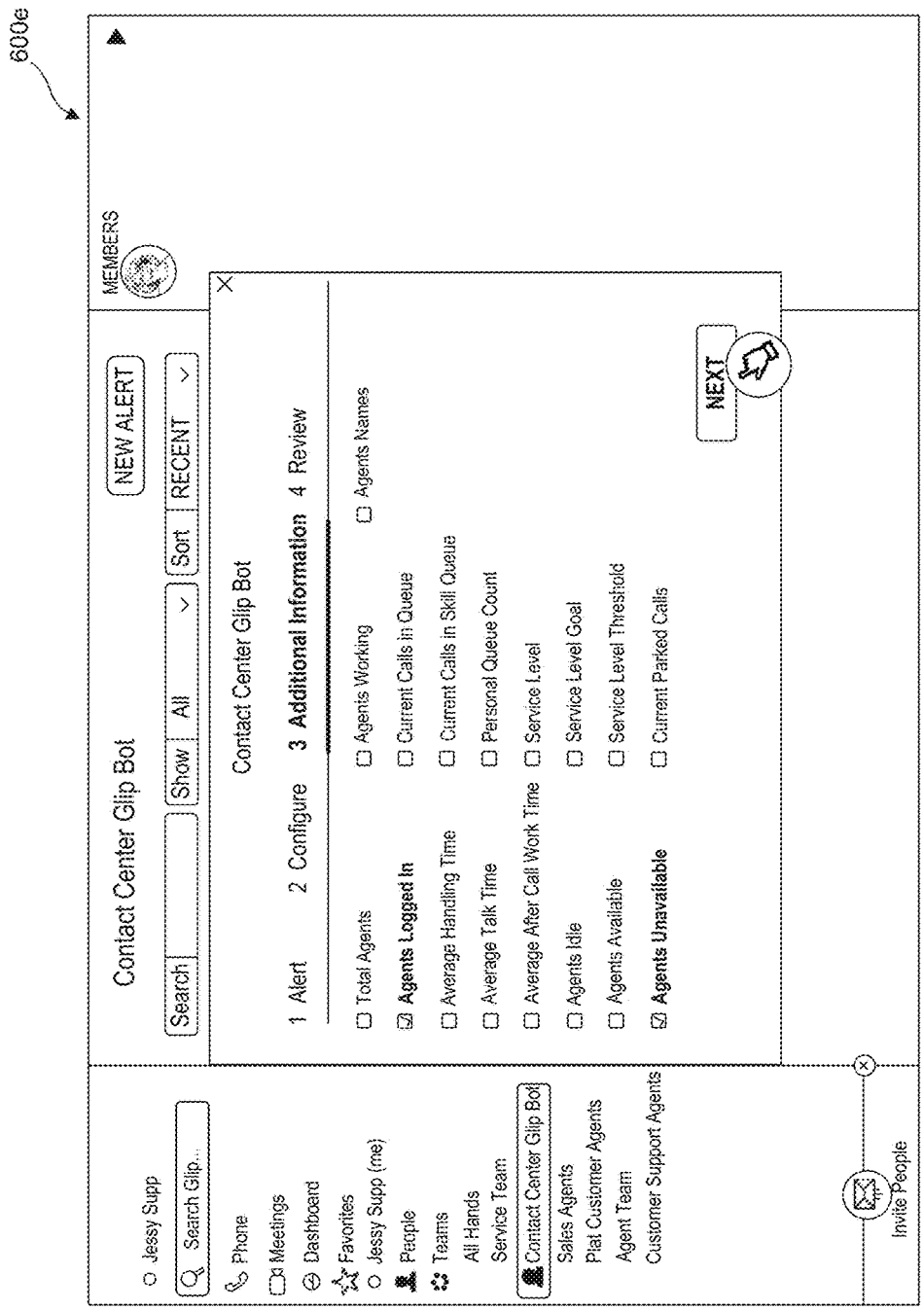

FIG. 6E shows another display 600e on a device (such as a workstation at a contact center or a mobile device) associated with a user. As shown in FIG. 6E, the user may configure additional information to be included in the notification via the user interface. For example, the user may configure total agents, agents logged in, average handling time, and other information to be included in the notification. In this example, the user configures agents logged in and agents unavailable as additional information to be included in the notification.

Figure 6F:
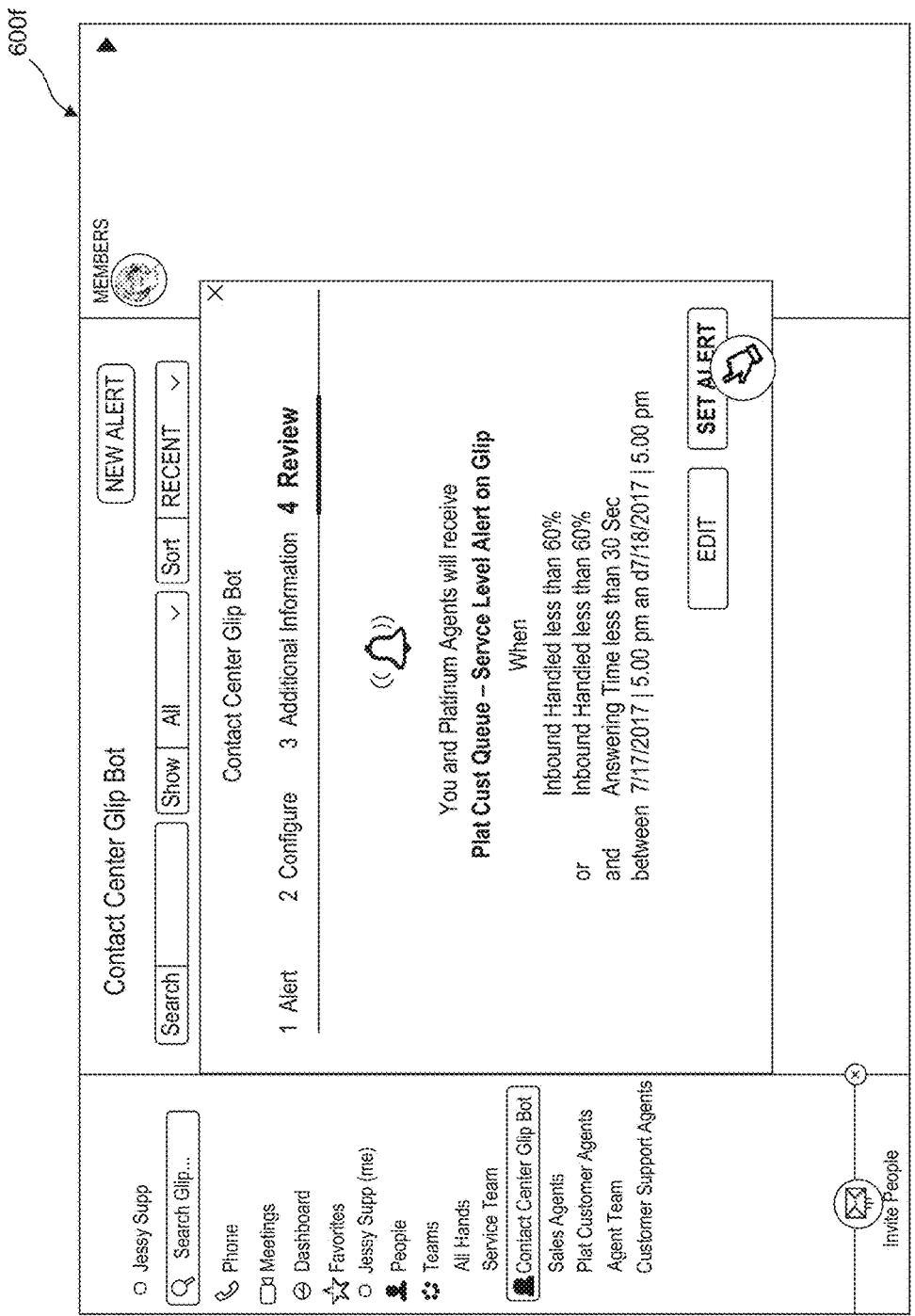

FIG. 6F shows another display 600f on a device (such as a workstation at a contact center or a mobile device) associated with a user. As shown in FIG. 6F, the user may review the configurations for receiving notifications from the contact center server, and the user may create the alert via the user interface.

Figure 7:
FIG. 7 is an example contact center notification, consistent with the disclosed embodiments.

FIG. 7 is an example contact center notification 700, consistent with the disclosed embodiments. As shown in FIG. 7, when a service level at the contact center drops below the threshold configured by the user, the user receives a notification from a contact center server associated with the contact center, such as the contact center server 140, notifying the occurrence of the event. The notification may be received at a device associated with the user, such as a mobile device operating in a collaboration environment. The notification may include the current service level of the contact center, such as percentage of calls answered in an answering time configured by the user. In some embodiments, the notification may include a link for the user to access an application for workflow management so as to improve the service level at the contact center.

FIGS. 8A-8D illustrate another example user interface for managing events at a contact center, in accordance with embodiments of the present disclosure. The example diagrams depicted in FIGS. 8A-8D illustrate embodiments in which a user of a contact center, such as a supervisor, communicates with other users of the contact center, such as agents, upon receiving the notification notifying the occurrence of certain event at the contact center. The diagrams depicted in FIGS. 8A-8D are examples only and are not intended to be limiting.

Figure 8A:
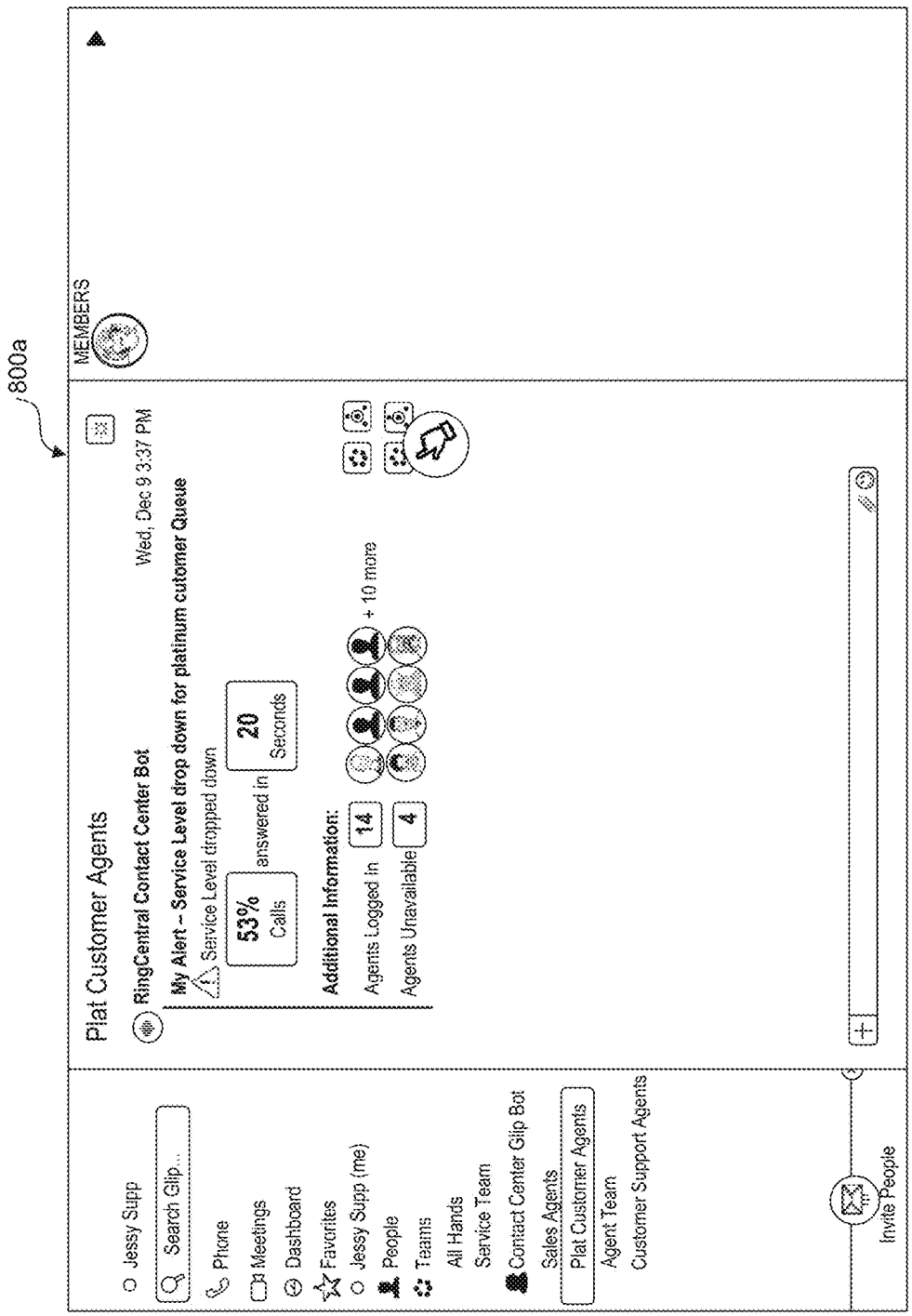
FIGS. 8A-8D illustrate another example user interface for managing events at a contact center, in accordance with embodiments of the present disclosure.

FIG. 8A shows a display 800a on a device (such as a workstation at a contact center or a mobile device) associated with a user. As shown in FIG. 8A, the device displays the notification that service level dropped down. The device also displays additional information including the agents logged in the contact center and unavailable agents. The additional information may be configured by the user during the setup of the notification. The device also displays an icon for the user to send messages to the unavailable agents in a single action. By selecting the icon, the user may send messages to the unavailable agents at substantially the same time, thereby simplifying the user operation. In some instances, a communication session (such as a chat) is already established between members of a collaboration team group including the unavailable agents. The supervisor may then type a message and send it in the communication session. All unavailable agents will receive the message because they are included in the collaboration team group.

Figure 8B:
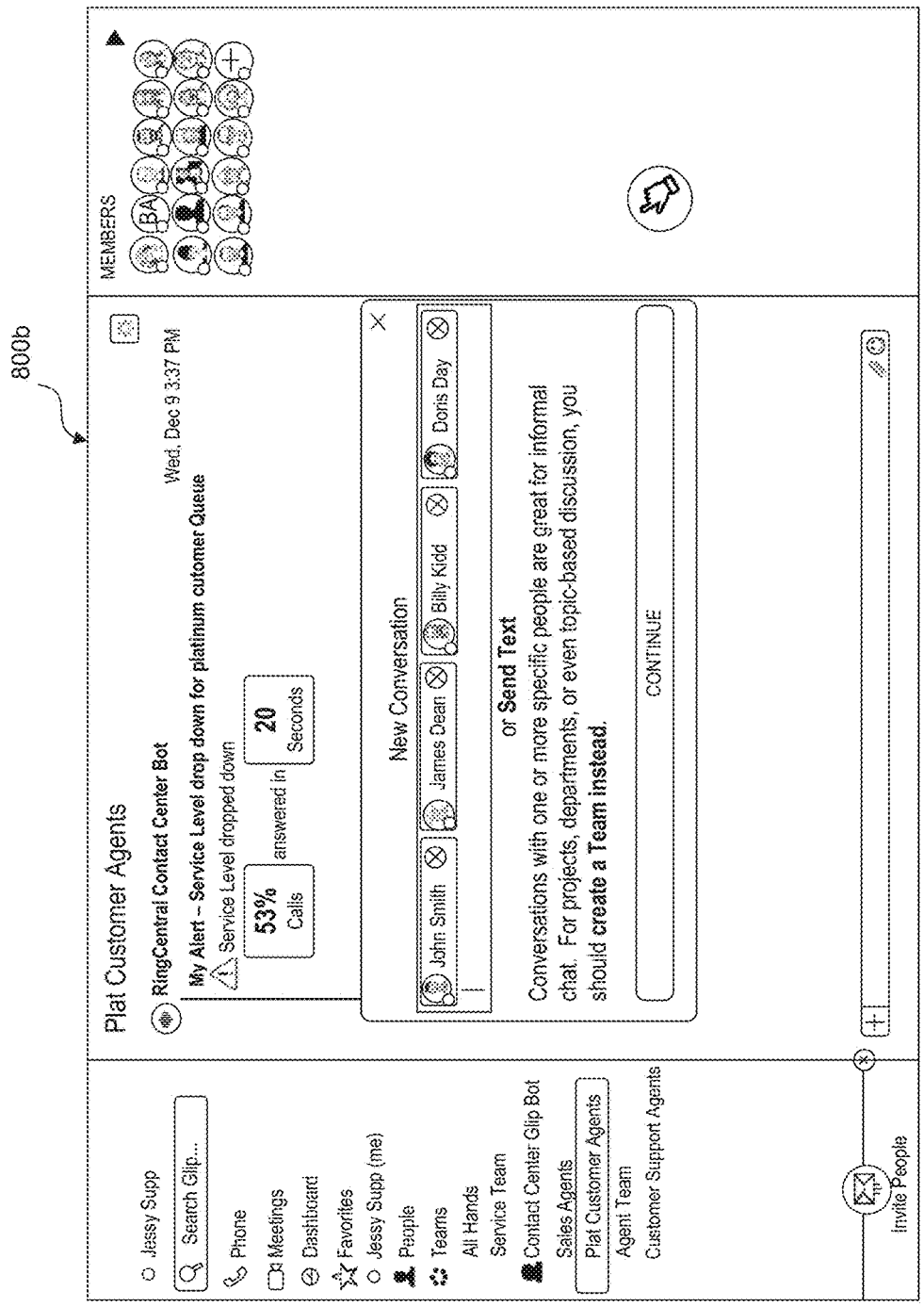

FIG. 8B shows a display 800b on a device (such as a workstation at a contact center or a mobile device) associated with a user. Here the user named Jessy Supp, a supervisor of the contact center, selects the icon to send messages to the unavailable agents James Smith, Billy Kidd and Doris Day and James Dean. As shown in FIG. 8B, the user interface allows the user to send a message to the four unavailable agents simultaneously via the collaborative communication environment. In this example, the user creates a new conversation with the unavailable agents via the collaborative communication environment.

Figure 8C:
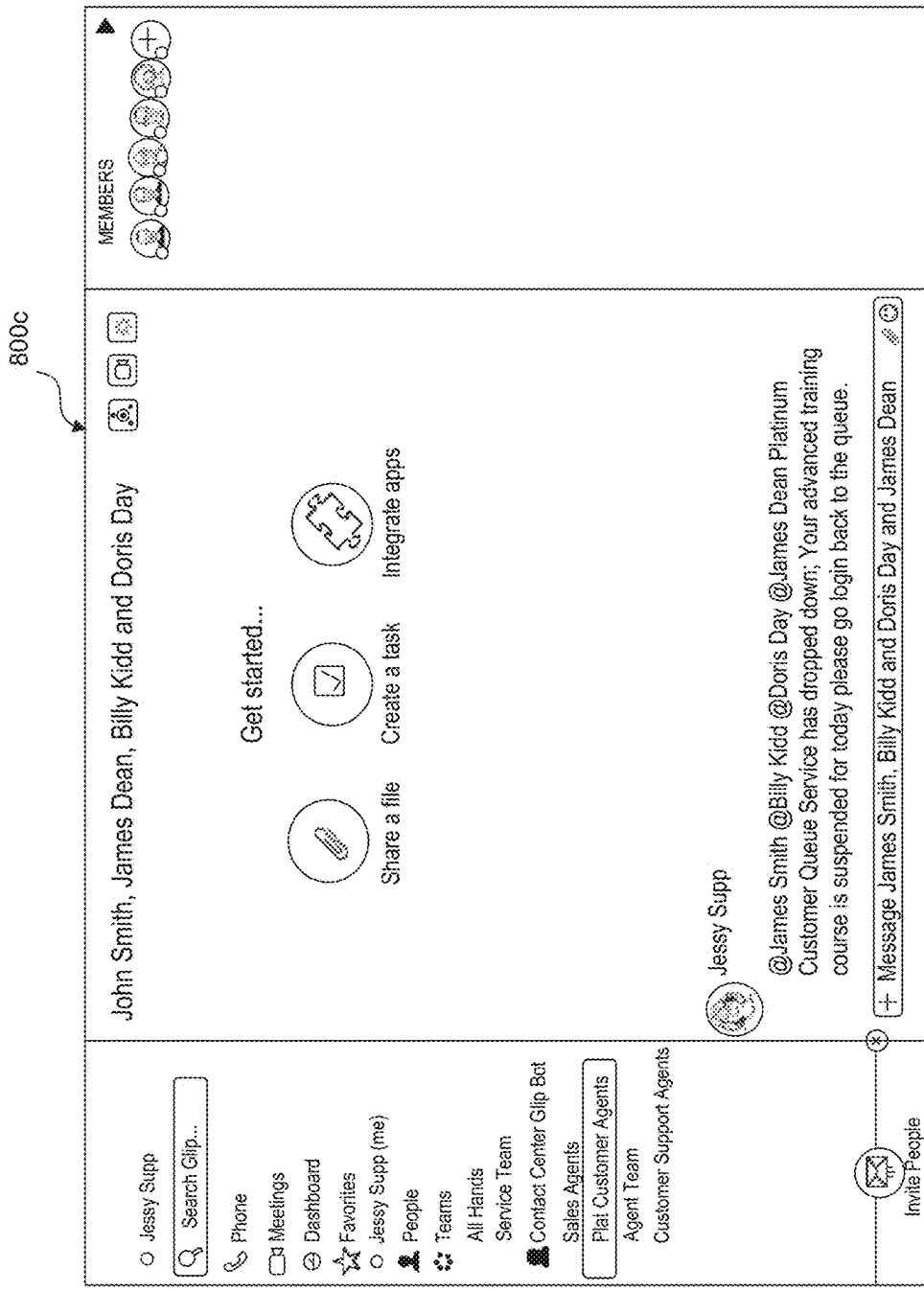

FIG. 8C shows a display 800c on a device (such as a workstation at a contact center or a mobile device) associated with a user. As shown in FIG. 8C, the user sent a message to the unavailable agents James Smith, Billy Kidd and Doris Day and James Dean and instructed them to login back to the queue from the training course. The collaborative communication environment also allows the agents to respond to the instruction sent by the supervisor Jessy Supp in the same conversation.

Figure 8D:
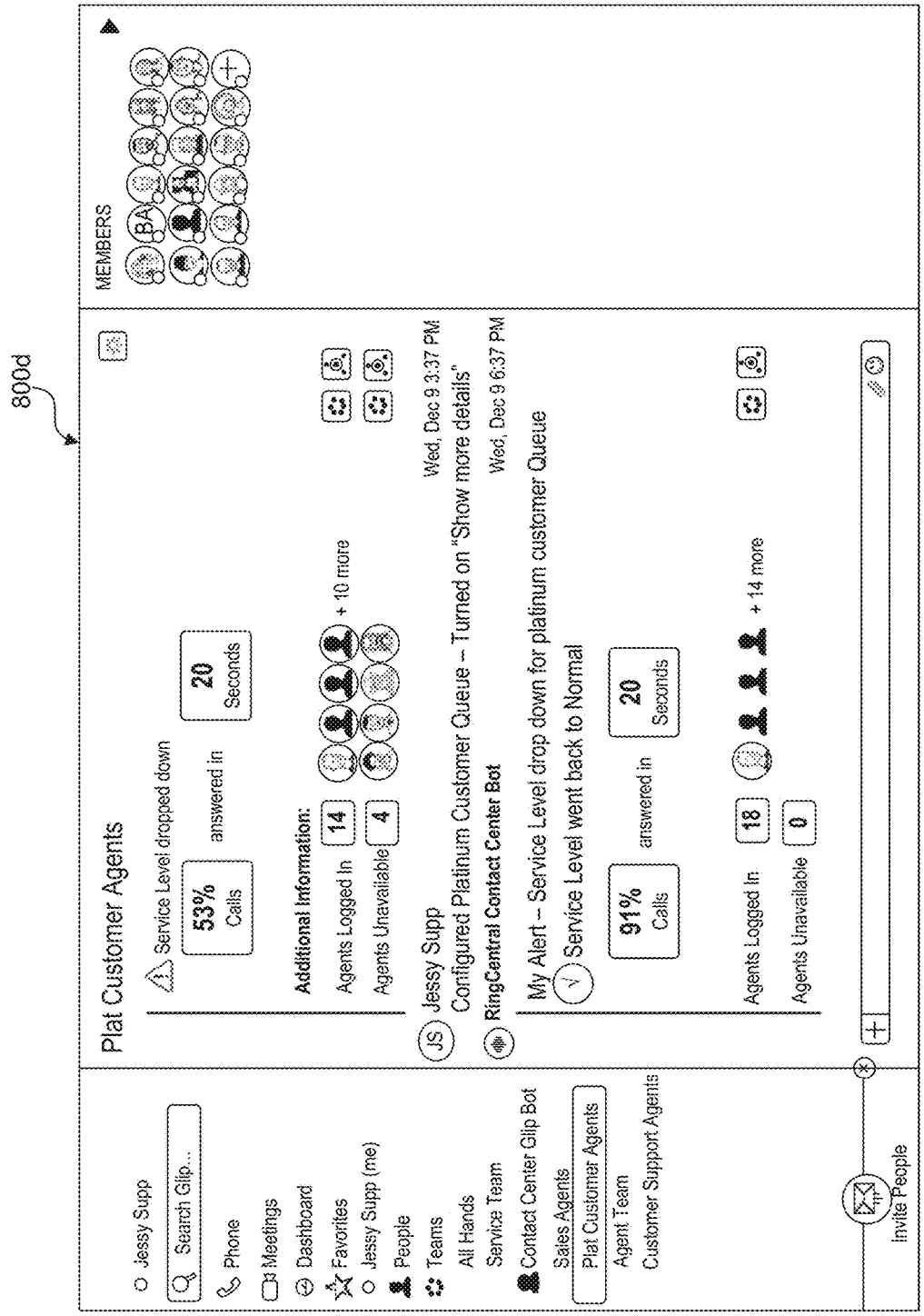

FIG. 8D shows a display 800d on a device (such as a workstation at a contact center or a mobile device) associated with a user. After a certain period time, the service level at the contact center went back to normal, and the event configured by the user for receiving notification no longer exists. As shown in FIG. 8D, the user receives another notification that the service level at the contact center went back to normal. The notification may include the updated analytics at the contact center, such as the percentage of calls answered in the time period configured by the user. The notification may also include additional information such as agents logged in the contact center and unavailable agents. The user interface may include an icon for the user to send messages to the agents currently logged in the contact center at substantially the same time in a single action, thereby simplifying the user operation.

In the preceding disclosure, various example embodiments have been described with reference to the accompanying drawings. It will, however, be evident that various modifications and changes may be made thereto, and additional embodiments may be implemented, without departing from the broader scope of the disclosure as set forth in the claims that follow. The disclosure and drawings are accordingly to be regarded in an illustrative rather than restrictive sense.

Therefore, it is intended that the disclosed embodiments and examples be considered as examples only, with a true scope of the present disclosure being indicated by the following claims and their equivalents.

What is claimed is:

1. A system for managing events at a contact center, comprising:
  a memory; and
  at least one processor configured to:
    receive an input from a user identifying at least one condition associated with a service level at the contact center, the at least one condition including at least a threshold of a call waiting time at the contact center;
    detect an occurrence of an event meeting the at least one condition;

in response to the detecting, provide a notification to a device associated with the user and operating in a collaboration environment, thereby notifying the occurrence of the event, wherein the user exchanges messages with one or more agents associated with the contact center via the collaboration environment;

identify one or more behavior patterns of the one or more agents associated with the contact center, wherein identifying the one or more behavior patterns of the one or more agents associated with the contact center includes identifying a time period of a day during which a number of agents will log off the contact center;

predict an occurrence of another event meeting one of the at least one condition based on the one or more behavior patterns; and provide another notification to the device notifying the predicted occurrence of the another event.

2. The system of claim 1, wherein the at least one condition includes a threshold of a number of calls currently being on held at the contact center.

3. The system of claim 1, wherein the at least one processor is further configured to: in response to the detecting, provide an interface for the user to send one or more messages to the one or more agents associated with the contact center via the collaboration environment.

4. The system of claim 3, wherein the one or more agents include a plurality of agents, and the interface includes an icon for the user to send a message to the plurality of agents at substantially the same time.

5. The system of claim 1, wherein the notification further notifies the user an average call handling time at the contact center.

6. The system of claim 1, wherein the at least one processor is further configured to provide an interface for the user to input the at least one condition, wherein the interface includes a first area for the user to select an object, a second area for the user to select an operator, and a third area for the user to enter a value associated with the selected object.

7. The system of claim 1, wherein the at least one processor is further configured to:
detect that the at least one condition associated with the service level at the contact center is no longer met; and
in response to the detecting, provide another notification to the device notifying that the service level at the contact center is back to normal.

8. A computer-implemented method for managing events at a contact center, comprising:
receiving an input from a user identifying at least one condition associated with a service level at the contact center, the at least one condition including at least a threshold of a call waiting time at the contact center;
detecting an occurrence of an event meeting the at least one condition;
in response to the detecting, providing a notification to a device associated with the user and operating in a collaboration environment, thereby notifying the occurrence of the event, wherein the user exchanges messages with one or more agents associated with the contact center via the collaboration environment;
identifying one or more behavior patterns of the one or more agents associated with the contact center, wherein identifying the one or more behavior patterns of the one or more agents associated with the contact center includes identifying a time period of a day during which a number of agents will log off the contact center;
predicting an occurrence of another event meeting one of the at least one condition based on the one or more behavior patterns; and
providing another notification to the device notifying the predicted occurrence of the another event.

9. The computer-implemented method of claim 8, wherein the at least one condition includes a threshold of a number of calls currently being on held at the contact center.

10. The computer-implemented method of claim 8, further comprising: in response to the detecting, providing an interface for the user to send one or more messages to one or more agents associated with the contact center via the collaboration environment.

11. The computer-implemented method of claim 10, wherein the one or more agents include a plurality of agents, and the interface includes an icon for the user to send a message to the plurality of agents at substantially the same time.

12. The computer-implemented method of claim 8, wherein the notification further notifies the user an average call handling time at the contact center.

13. The computer-implemented method of claim 8, further comprising:
detecting that the at least one condition associated with the service level at the contact center is no longer met; and
in response to the detecting, providing another notification to the device notifying that the service level at the contact center is back to normal.

14. A non-transitory computer readable medium that stores a set of instructions that is executable by at least one processor of a contact center server to cause the contact center server to perform a method for managing events at a contact center, the method comprising:
receiving an input from a user identifying at least one condition associated with a service level at the contact center, the at least one condition including at least a threshold of a call waiting time at the contact center;
detecting an occurrence of an event meeting the at least one condition;
in response to the detecting, providing a notification to a device associated with the user and operating in a collaboration environment, thereby notifying the occurrence of the event, wherein the user exchanges messages with one or more agents associated with the contact center via the collaboration environment;
identifying one or more behavior patterns of the one or more agents associated with the contact center, wherein identifying the one or more behavior patterns of the one or more agents associated with the contact center includes identifying a time period of a day during which a number of agents will log off the contact center;
predicting an occurrence of another event meeting one of the at least one condition based on the one or more behavior patterns; and
providing another notification to the device notifying the predicted occurrence of the another event.

* * * * *